(12) United States Patent
Wang et al.

(10) Patent No.: US 6,999,577 B2
(45) Date of Patent: Feb. 14, 2006

(54) MULTI-USER CALL WAITING

(75) Inventors: Myles Thomas Wang, San Francisco, CA (US); Stephen Vaughan Murphy, Halifax (CA); Liam Keast, Bedford (CA)

(73) Assignee: America Online, Inc., Dulles, VA (US)

( * ) Notice: Subject to any disclaimer, the term of this patent is extended or adjusted under 35 U.S.C. 154(b) by 242 days.

(21) Appl. No.: 10/674,797

(22) Filed: Oct. 1, 2003

(65) Prior Publication Data

US 2005/0018833 A1 Jan. 27, 2005

Related U.S. Application Data

(60) Provisional application No. 60/488,386, filed on Jul. 21, 2003.

(51) Int. Cl.
*H04M 3/00* (2006.01)

(52) U.S. Cl. .............................. 379/265.09; 379/142.08; 379/215.01

(58) Field of Classification Search ................. 370/352; 379/142.06, 142.08, 207.14, 207.15, 211.01, 379/215.01, 265.02, 265.04, 265.05, 265.09, 379/265.11, 265.12
See application file for complete search history.

(56) References Cited

U.S. PATENT DOCUMENTS

| | | | |
|---|---|---|---|
| 5,329,578 A | | 7/1994 | Brennan et al. |
| 5,375,161 A | | 12/1994 | Fuller et al. |
| 5,537,467 A | | 7/1996 | Cheng et al. |
| 5,548,636 A | | 8/1996 | Bannister et al. |
| 5,557,659 A | | 9/1996 | Hyde-Thomson |
| 5,651,054 A | | 7/1997 | Dunn et al. |
| 5,703,943 A | * | 12/1997 | Otto ...................... 379/265.11 |
| 5,805,587 A | * | 9/1998 | Norris et al. ............... 370/352 |
| 5,809,128 A | | 9/1998 | McMullin |
| 5,848,134 A | | 12/1998 | Sekiguchi et al. |
| 5,894,504 A | | 4/1999 | Alfred et al. |
| 6,144,644 A | * | 11/2000 | Bajzath et al. .............. 370/259 |
| 6,215,857 B1 | | 4/2001 | Kasiviswanathan |
| 6,282,275 B1 | * | 8/2001 | Gurbani et al. ........ 379/142.06 |
| 6,295,341 B1 | | 9/2001 | Muller |
| 6,301,609 B1 | | 10/2001 | Aravamudan et al. |
| 6,311,231 B1 | * | 10/2001 | Bateman et al. ....... 379/265.09 |

(Continued)

FOREIGN PATENT DOCUMENTS

WO    WO 00/60809    10/2000

OTHER PUBLICATIONS

Anonymous: "Does the Internet Have Call Waiting?", Internet Document, [Online] Copyright 2002, Tech TV, Inc., pp. 1–2, Retrieved from the Internet: www.techtv.com/screensavers/print/0,23102,2256423,00.html, [retrieved on Oct. 2, 2002].

(Continued)

*Primary Examiner*—Bing Q. Bui
(74) *Attorney, Agent, or Firm*—Fish & Richardson P.C.

(57) ABSTRACT

Alerting an intended recipient of a phone call includes identifying an account based on a phone call received from a caller and accessing configuration data related to the account. Several identities associated with the account are identified based on the configuration data accessed. A first identity is determined from among the several identities based on the configuration data accessed. The availability of the first identity to receive a first electronic communication associated with the phone call is determined. The first electronic communication associated with the phone call is sent to the first identity conditioned on whether the first identity is determined to be available to receive the first electronic communication.

79 Claims, 7 Drawing Sheets

U.S. PATENT DOCUMENTS

| | | | | |
|---|---|---|---|---|
| 6,356,633 B1 | * | 3/2002 | Armstrong | 379/265.11 |
| 6,366,661 B1 | * | 4/2002 | Devillier et al. | 379/211.01 |
| 6,373,836 B1 | * | 4/2002 | Deryugin et al. | 370/352 |
| 6,377,668 B1 | * | 4/2002 | Smock et al. | 379/142.08 |
| 6,389,007 B1 | * | 5/2002 | Shenkman et al. | 370/352 |
| 6,404,747 B1 | * | 6/2002 | Berry et al. | 370/270 |
| 6,421,425 B1 | * | 7/2002 | Bossi et al. | 379/52 |
| 6,463,145 B1 | | 10/2002 | O'Neal et al. | |
| 6,477,246 B1 | | 11/2002 | Dolan et al. | |
| 6,496,501 B1 | | 12/2002 | Rochkind et al. | |
| 6,518,994 B1 | * | 2/2003 | Johnson et al. | 348/14.11 |
| 6,532,286 B1 | * | 3/2003 | Burg | 379/209.01 |
| 6,631,399 B1 | * | 10/2003 | Stanczak et al. | 709/206 |
| 6,671,365 B1 | | 12/2003 | Kemppainen | |
| 6,738,461 B1 | | 5/2004 | Trandal et al. | |
| 6,775,378 B1 | * | 8/2004 | Villena et al. | 379/266.07 |
| 2003/0133558 A1 | | 7/2003 | Kung et al. | |

OTHER PUBLICATIONS

Anoymous: "Did Someone Just Call You?", Internet Document, [Online] Copyright 2002, CallWave, Inc., p. 1, Retrieved from the Internet: www.callwave.com, [retrieved on Oct. 2, 2002].

Anonymous: "Internet Answering Machine™ Software", Internet Document, [Online] Copyright 2002, CallWave, Inc. pp. 1–2, [Retrieved from the Internet: www.callwave.com/findoutmore.asp?ct=hp1 fom, Oct. 2, 2002].

Rick James: "Finally! Interactive 'Call Waiting' While You're Surfing?", Internet Document, [Online], pp. 1–4, Retrieved from the Internet: www.monitor.ca/monitor/issues/vol4iss12/feature7.html, [retrieved on Sep. 2, 2004].

* cited by examiner

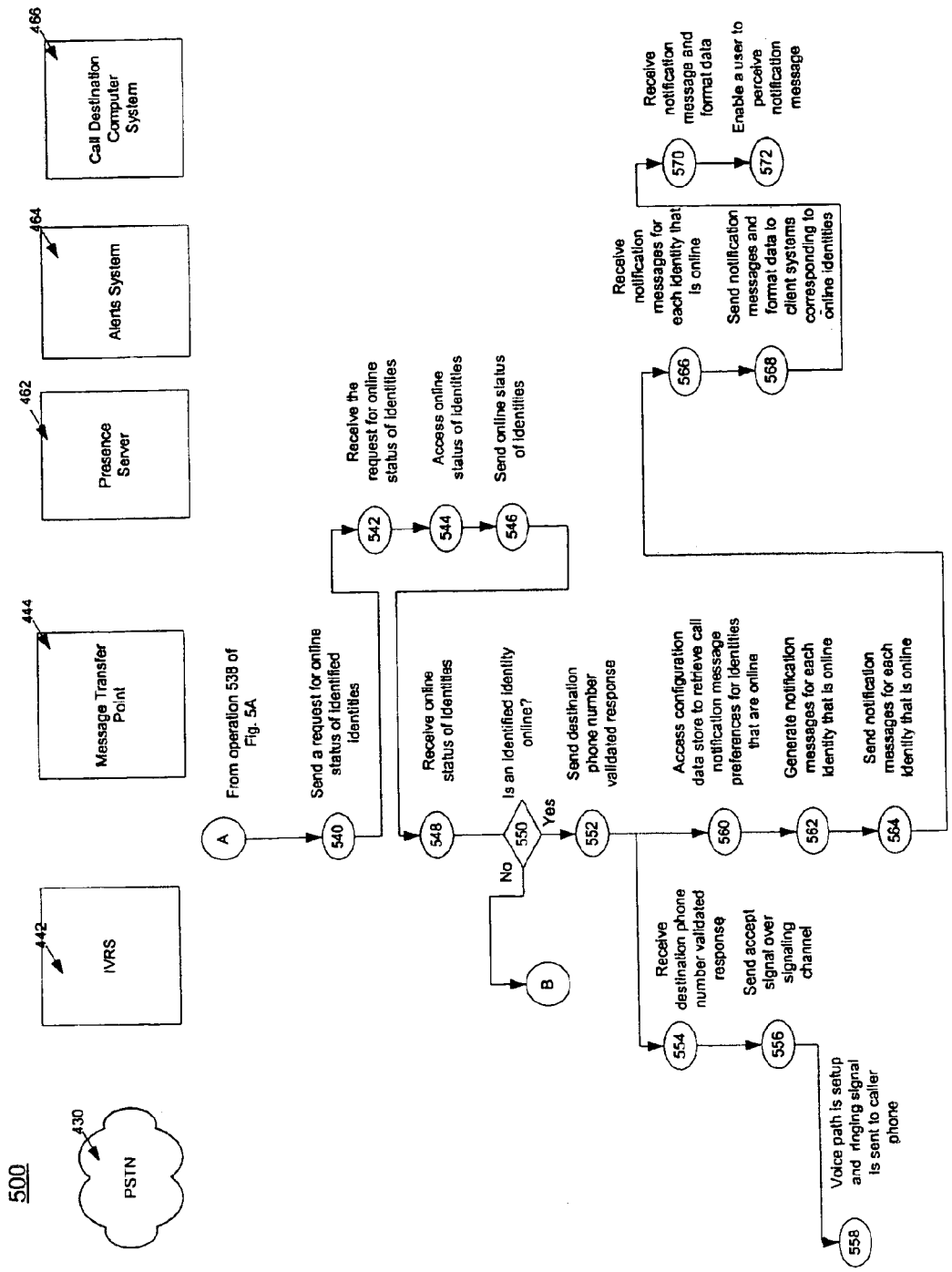

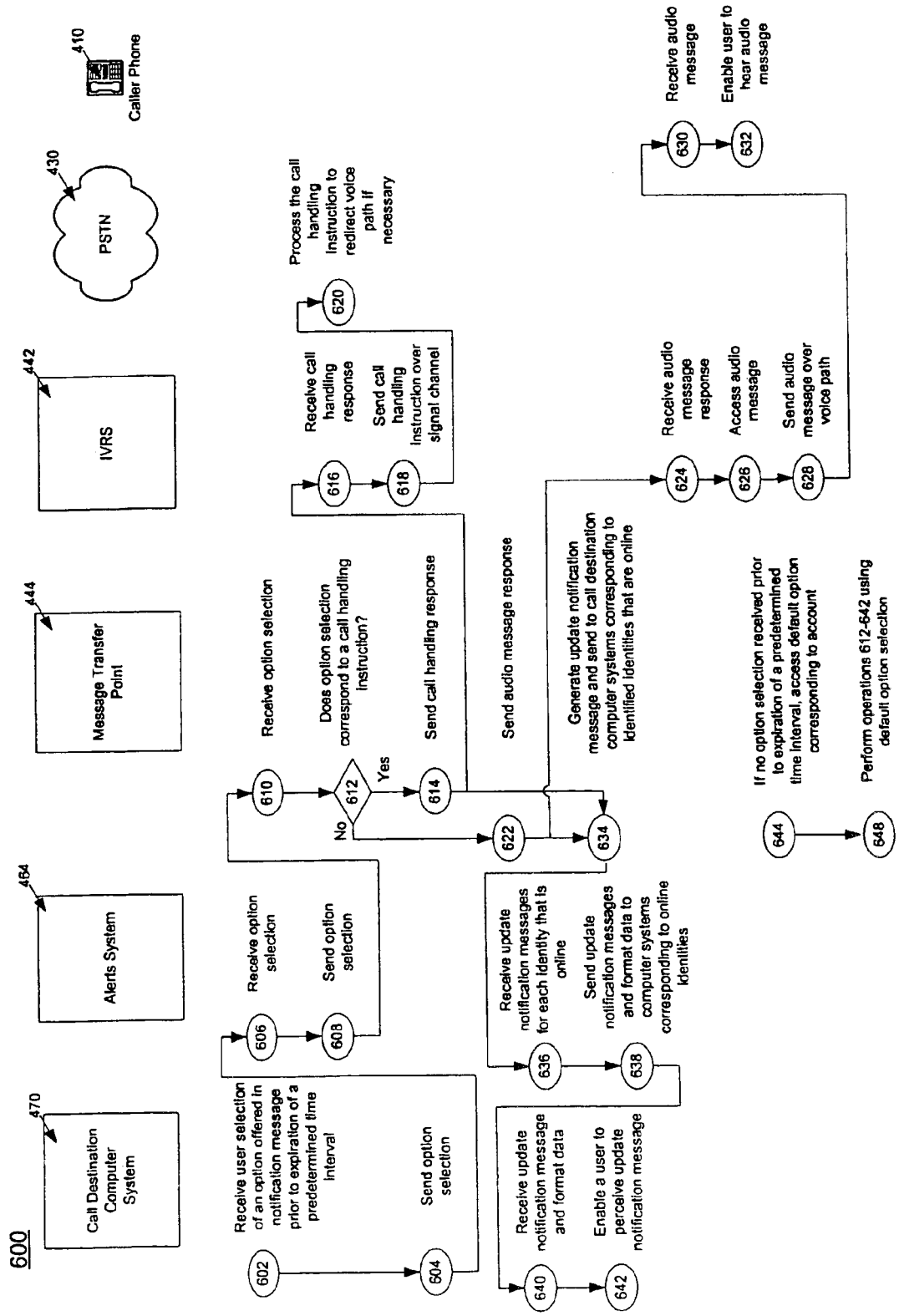

MULTI-USER CALL WAITING

CROSS REFERENCE TO RELATED APPLICATION

The application claims priority to Provisional U.S. Patent Application No. 60/488,386, filed Jul. 21, 2003, and titled Multi-User Call Waiting and incorporates by reference U.S. Patent Application No. 10/414,167, filed Apr. 15, 2003, and titled COMMUNICATION DEVICE MONITORING and U.S. Patent Application No. 10/320,712, filed Dec. 17, 2002, and titled CASCADED DELIVERY OF AN ELECTRONIC COMMUNICATION.

TECHNICAL FIELD

This document relates to a system and method that enables multiple users associated with a telephone direct number to be made aware of an incoming call and to process the incoming call in accordance with a set of call handling options.

BACKGROUND

Call waiting is a telephony service that allows call recipients to avoid missing calls that would otherwise be blocked due to the call recipient using or otherwise occupying the phone line. Call waiting informs call recipients of blocked incoming calls and enables call recipients to dispose of the blocked incoming call by, for example, either accepting the call or ignoring the call. Traditional call waiting systems used for voice based telephone interconnections typically inform call recipients of a blocked incoming call by inserting an audio cue (e.g., a short series of tones) into the voice path of the phone line. The call recipient hears the audio cue and may respond to the audio cue by suspending the conversation with the first caller to engage in conversation with the incoming or second caller.

SUMMARY

In one general aspect, alerting an intended recipient of a phone call includes identifying an account based on a phone call received from a caller and accessing configuration data related to the account. Several identities associated with the account are identified based on the configuration data accessed. A first identity is determined from among the several identities based on the configuration data accessed. The availability of the first identity to receive a first electronic communication associated with the phone call is determined. The first electronic communication associated with the phone call is sent to the first identity conditioned on whether the first identity is determined to be available to receive the first electronic communication.

Implementations may include one or more of the following features. For example, determining whether the first identity is available may include checking an online status for the first identity, and if the first identity is determined to be online, sending the first electronic communication to the first identity. Identifying an account based on a phone call may include identifying an account based on call-related information received from a telephone network. The call-related information may include a call destination phone number and may be extracted from an integrated services digital network call setup.

Alerting an intended recipient of a phone call may further include receiving call origin information from a telephone network. The call origin information may include a caller phone number and may be received through an automatic number identification service. The first electronic communication may include at least a portion of the call origin information such that at least a portion of the call origin information is sent to the first identity if the first identity is determined to be available to receive the call origin information.

The several identities may be user identifiers through which the online status of an associated user may be determined. The several identities may be screen names for an instant messaging application.

Accessing configuration data may include accessing call waiting preferences that are tailored to each of the several identities. Determining a first identity from among the several identities may include determining the first identity based on the call waiting preferences. Determining a first identity based on the call waiting preferences may include examining call waiting preferences of the several identities to determine whether a phone number of the caller is included in a block list maintained for one or more of the several identities, and selecting the first identity from among the several identities if the block list maintained for the first identity does not include the phone number of the caller.

Determining a first identity based on the call waiting preferences may include accessing parental controls associated with one or more of the several identities, and selecting the first identity based on whether the parental controls associated therewith effect restrictions for a phone number of the caller. The restrictions for a phone number of the caller may be based on the time of day in which the call was received.

Alerting an intended recipient of a phone call may further include making available to the first identity call processing options that will be presented by a call destination computer system to the first identity. The call processing options may include an option to forward the call to another phone number, an option to take a message from a calling party, an option to ignore the call, and an option to send an audio message to the caller. The audio message may be selected by the first identity from among multiple different audio messages. The multiple different audio messages may include an audio message that informs the caller that the call is being redirected to another phone number and/or an audio message that informs the caller that the call will be answered by a call recipient shortly. The call processing options may be tailored to the first identity.

Alerting an intended recipient of a phone call may further include receiving and processing an option selection from the first identity and accessing and processing a default option selection if no option selection is received from the first identity within a predetermined interval of time. The processing performed with respect to the option selection may vary based upon whether option selection is received from the first identity within a predetermined interval of time. Processing the option selection may include sending a call handling instruction that corresponds to the option selection to a telephone network through which the phone call was made. The call handling instruction may direct the telephone network to forward the call. The call may be forwarded to a voicemail system. Processing the option selection may include sending to the caller an audio message that corresponds to the option selection.

Alerting an intended recipient of a phone call may further include determining a second identity from among several identities to receive a second electronic communication associated with the phone call and determining whether the second identity is available to receive a second electronic communication associated with the phone call. If the second identity is determined to be available to receive the second electronic communication, the second electronic communication is sent to the second identity.

The first electronic communication may include data corresponding to call processing options that will be presented to the first identity by a first call destination computer system, and the second electronic communication may include data corresponding to call processing options that will be presented to the second identity by a second call destination computer system. The first call destination computer and the second call destination computer may be a single computer accessible to both the first identity and the second identity.

A first option selection may be received from the first identity and a second option selection may be received from the second identity. The phone call may be responded to in accordance with the first option selection if the first option selection is received before the second option selection. A rank may be accessed for the first option selection and for the second option selection, and the phone call may be responded to in accordance with the first option selection if the first option selection has a higher rank than the second option selection. A rank may be accessed for the first identity and for the second identity, and the phone call may be responded to in accordance with the first option selection if the first identity has a higher rank than the second identity.

In another general aspect, a computer system for alerting an intended recipient of a phone call includes a data store for storing configuration data, a telephony interface element configured to receive a phone call from a caller, and a call processing element. The call processing element is configured to identify an account based on the phone call, access the data store to retrieve configuration data related to the account, and identify several identities associated with the account based on the configuration data accessed. The call processing element is configured to determine a first identity from among the several identities based on the configuration data accessed, determine whether the first identity is available to receive a first electronic communication associated with the phone call, and send to the first identity the first electronic communication associated with the phone call conditioned on whether the first identity is determined to be available to receive the first electronic communication.

Implementations may include one or more of the following features. For example, the telephony interface element may be an interactive voice response system. The call processing element may be configured to determine the availability of the first identity by requesting the online status of the first identity from an online service provider system. The call processing element may be configured to determine the online status of the first identity from a presence server of the online service provider system. The presence server may receive, update, and publish online presence data for identities.

The call processing element may be configured to send to the first identity the first electronic communication by sending the first electronic communication to an online service provider system, which sends the first electronic communication to the first identity. The call processing element may be configured to send to the first identity the first electronic communication by sending the first electronic communication to an alerts system of an online service provider system, which sends the first electronic communication to the first identity. The alerts system may be a computer system configured to enable real time or near real time transmission of the first electronic communication to the first identity.

The details of one or more implementations are set forth in the accompanying drawings and the description below. Other features will be apparent from the description and drawings, and from the claims.

DESCRIPTION OF DRAWINGS

FIGS. 5A and 5B are flow charts illustrating a process for generating and delivering call notification messages.

FIG. 6 is a flow chart illustrating a process for responding to a user selection of an option in a call notification message.

DETAILED DESCRIPTION

Figure 1:
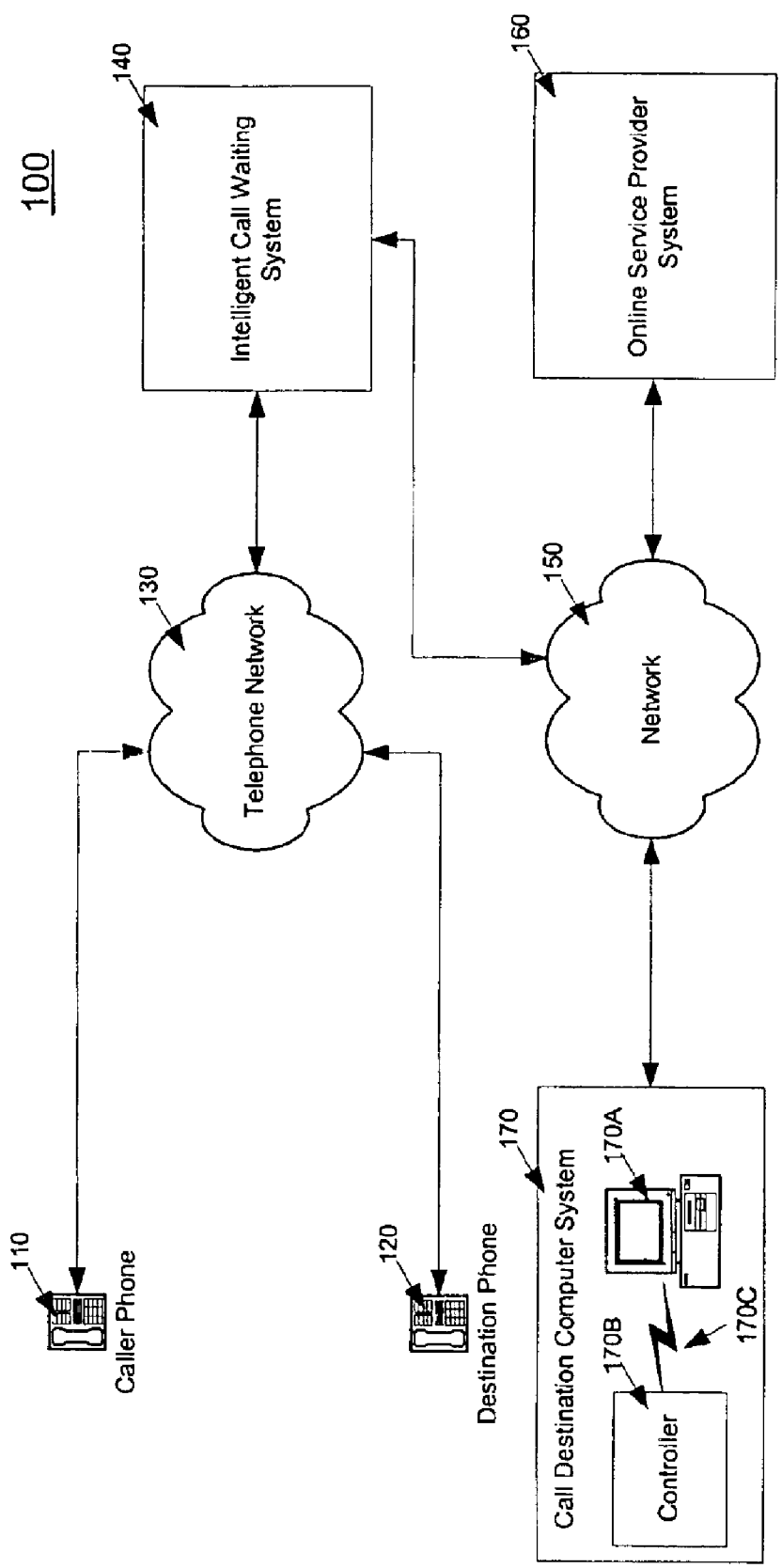
FIG. 1 is a block diagram of a communications system for providing mult-user intelligent call waiting.

A communications system directs an incoming call or sends information related to an incoming call to identities associated with a called number who are available to receive such information through means other than telephones to which a telephone network ordinarily directs the incoming call. For example, when a call recipient is engaged in a call on a landline phone to which an incoming call is directed, a notification of the incoming call is sent to user identities associated with the direct number of the landline phone. The user identities may be respectively online through, for example, (1) a home computer, (2) a personal digital assistant (PDA), and (3) an office computer. Each user identity may be presented with call handling options enabling the user corresponding to the user identity to ignore the call, take a message, play a specific audio message, or forward the call to another phone number. The call handling options may be the same for each user or may vary based on location, login mode, or equipment. For example, with limited capabilities, the PDA user may receive only a visual indication of the incoming call and may only be able to forward the call to one other phone number. In contrast, the home computer user may receive much more caller identity information including address and return phone number and may choose from a wider variety of options including the option to play various audio messages, take a message, and forward the call to a phone number selected by the user from a large number of possible phone numbers.

In one implementation, a communications system for providing multi-user intelligent call waiting includes a caller phone configured to place a call to a call destination phone across a telephone network. The telephone network is configured to forward the call to an intelligent call waiting system if the direct number of the call destination phone is busy, not answered after a predetermined number of rings, or otherwise configured to not receive incoming calls. The intelligent call waiting system receives the call and determines identities associated with the direct number of the call destination phone. The identities are user identifiers, such as, for example, screen names, through which a user's online status may be determined.

The intelligent call waiting system accesses call waiting preferences corresponding to the identities and identifies which of the identities may receive a call notification message, e.g., based on the call waiting preferences. The intelligent call waiting system then determines which of the identified identities are online (and thus available to receive a call notification message) by sending a request for presence information to an online service provider system. Upon receiving the presence information from the online service provider system, the intelligent call waiting system generates a call notification message for each identified identity that is online. The intelligent call waiting system sends the call notification messages to the online service provider system.

The online service provider system receives the call notification messages and sends in real time the received call notification messages along with format data to the call destination computer systems corresponding to the identified identities that are online. The call destination computer systems receive the call notification messages and format data, and respond by enabling user perception of the call notification messages.

A call notification message typically includes the identity of the caller (determined based on, for example, Automatic Number Identification (ANI) information) and a set of options that may be selected by the user to indicate how the call should be handled. Several options that may be selected include playing a specific audio message, ignoring the call, taking a message (i.e., forwarding a call to a voicemail system), and/or forwarding the call to another phone number (e.g., a cell phone number). The call notification message may be presented to a user as a dialog box in a visual display of the call destination computer system. The user may, for example, use a mouse or other input device to click or otherwise select an option presented in the dialog box.

When an option is selected by the user, the option selection is sent to the intelligent call waiting system in real time through the online service provider system. The intelligent call waiting system processes the call by sending call handling instructions to the telephone network and/or accessing and sending an audio message to the caller phone. Since multiple users may receive call notification messages corresponding to the same call and may select conflicting options, the intelligent call waiting system may employ a conflict resolution algorithm to process the received option selection data. Otherwise, conference calling may ensue.

Referring to FIG. 1, in one implementation, a communications system 100 for providing multi-user intelligent call waiting includes a caller phone 110, a call destination phone 120, a telephone network 130, an intelligent call waiting system 140, a network 150, an online service provider system 160, and a call destination computer system 170. The call destination computer system includes a device 170A that communicates with a controller 170B over a data pathway 170C.

The caller phone 110 is configured to place a call to the call destination phone 120 across the telephone network 130. The caller phone 110 and the call destination phone 120 may be landline phones that allow communications over the telephone network 130. In another implementation, the caller phone 110 and/or the call destination phone 120 may be a cellular phone or a mobile personal digital assistants (PDAs) with embedded cellular phone technology. In yet another implementation, the call destination phone 120 may integrate the call destination computer system 170 and operate as a single computer system.

The telephone network 130 is configured to enable direct or indirect voice communications between the caller phone 110, the call destination phone 120, and the intelligent call waiting system 140. If a user of the caller phone 110 places a call to the call destination phone 120 and the direct number corresponding to the call destination phone 120 is busy or not answered after a predetermined number of rings, the telephone network 130 is configured to forward the call to the intelligent call waiting system 140 (i.e., a call forward busy/no answer service is enabled on the phone line of the call destination phone 120).

When the call is forwarded to the intelligent call waiting system 140, the telephone network 130 is configured to send call-related information to the intelligent call waiting system 140 over a signaling channel. The call-related information includes call origin and call destination information. The call origin information may include the direct number of the caller phone 110 and the time and date when the call was initiated, and the call destination information may include the direct number of the call destination phone 120. The call origin information may be delivered, for example, through a service known as Automatic Number Identification (ANI), and the call destination information may be delivered, for example, by extracting called number information from the integrated services digital network (ISDN) call setup or, alternatively, through a service known as Dialed Number Identification Service (DNIS).

The telephone network 130 also is configured to receive call handling instructions from the intelligent call waiting system 140. The call handling instructions are instructions that tell the telephone network 130 how to process a call. The call handling instructions may include, for example, instructions to accept a call, refuse a call, and forward a call to another telephone number (e.g., to a telephone number corresponding to a voicemail system or a different telephone).

The telephone network 130 may include a circuit-switched voice network, a packet-switched data network, or any other network able to carry voice. For example, circuit-switched voice networks may include the Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The intelligent call waiting system 140 is a computer system configured to receive a call from the caller phone 110 that has been forwarded to the intelligent call waiting system 140 by the telephone network 130. The intelligent call waiting system 140 receives the call destination direct number from the telephone network 130, identifies identities associated with the call destination direct number, and processes the call in accordance with account-level and identity-level call waiting preferences associated with the call destination direct number. The identities associated with the call destination direct number may be identified, for example, by accessing an account record indexed by the call destination direct number and stored in a configuration data store. The account record includes the identities and the account-level and identity-level call waiting preferences.

The account-level call waiting preferences are preferences that are not associated with any particular identity but rather are associated with all identities. For example, account-level call waiting preferences may include a "black list" of identified phone numbers and a "white list" of identified phone numbers. If the intelligent call waiting system 140 receives a call from a caller phone 110 having a direct number on the "black list," the intelligent call waiting system 140 may ignore the call (i.e., the call is not answered and is allowed to continuously ring) or, alternatively, may send a message to the telephone network 130 or the caller phone 110, e.g., an audio message, telling the caller not to call the direct number of the call destination phone 120 anymore or an electronic message to the telephone network 130 that inspires an audio message to the cellular phone 110 indicating unavailability of the call destination phone 120. If the intelligent call waiting system 140 receives a call corresponding to a direct number on the "white list," the intelligent call waiting system 140 may automatically forward the call to another number (e.g., a specified cell phone number or voicemail number).

The identity-level call waiting preferences are preferences that are tailored to each identity. The identity level preferences include, for example, instructions prohibiting the intelligent call waiting system 140 from sending a call notification message to a particular identity when the direct number of the caller phone 110 has been placed on a prohibited list for that identity. Each identity may have its own prohibited and/or white lists. The identity-level preferences also may include instructions regarding how the call notification message sent to an identity should be formatted and what options should appear in the call notification message.

The identity-level call waiting preferences may further include parental controls. For example, some identities may correspond to children and other identities may correspond to parents. The call waiting preferences of identities corresponding to children may include instructions prohibiting the intelligent call waiting system 140 from sending call notification messages to those identities when they are online or, alternatively, from sending call notification messages to those identities when they are online during certain times of the day (e.g., late at night or when the child is at school).

For example, the Smith account may include two identities associated with it, "jillsmith2" corresponding to a user named Jill and "joesmith3" corresponding to a user named Joe. The Smith account has placed phone numbers of various telemarketing businesses on a "black list" and the phone number of Joe's parents on a "white list." Accordingly, the account-level preferences are set to ignore calls from the telemarketing businesses and forward calls from Joe's parents to Joe's cell phone number. Furthermore, the identity-level preferences for "jillsmith2" are set such that the notification message presented to Jill includes the following options: ignore the call, take a message, and send an audio message stating, "Please call back later." The identity-level preferences for "joesmith3" are set such that the notification message presented to Joe includes the following options: ignore the call, take a message, forward the call to Joe's cell phone, and send an audio message. If the option selected is to send an audio message, Joe is presented with a menu from which he may select one of the following audio messages: "Please call back later," "I'll call you back," "I don't know you," and "Please call my cell phone at (202) 123-4567." Joe and Jill may have recorded the audio messages in their own voice to personalize the messages or, alternatively, may have chosen the messages from a list of prerecorded audio messages. In another implementation, Joe may have included the sending of an audio message stating, "You are being transferred to my cell phone" prior to the forwarding of the call to his cell phone.

The intelligent call waiting system 140 processes the call by identifying which identities may receive a call notification message based on the account-level and identity-level call waiting preferences. The system 140 requests the online status of the identified identities from the online service provider system 160 and call notification messages for each identified identity that is online in accordance with the identity-level preferences. The intelligent call waiting system 140 sends the call notification messages to the online service provider system 160, which sends along with format data the call notification messages over the network 150 to one or more call destination computer systems 170 for presentation to users. Each user of a call destination computer system 170 selects an option presented in the call notification message, and the option selection is sent to the online service provider system 160 over the network 150. The online service provider system 160 relays the option selection to the intelligent call waiting system 140, which processes the option selection accordingly.

If no user of a call destination computer selects an option prior to expiration of a predetermined interval of time (e.g., 15 seconds), the intelligent call waiting system 140 may process a default option selection. The default option selection may be stored as an account-level preference and may correspond to sending an audio message, taking a message (i.e., forwarding the call to a voicemail system), and/or forwarding the call to another number (e.g., a cell phone number).

If multiple user identities submit option selections for the same call, the intelligent call waiting system 140 applies a conflict resolution algorithm to determine which option selection of the several received option selections will be processed. The conflict resolution algorithm may be, for example, a "first come, first serve" algorithm that processes the call in accordance with the first option selection received. Alternatively, the conflict resolution algorithm may include collecting option selections corresponding to different identities over a predetermined interval of time and then processing the call in accordance with the option selection corresponding to the identity assigned the highest rank. The rank assignment for each identity typically is stored as an identity-level preference. As another alternative, the conflict resolution algorithm may include processing the call in accordance with a ranking of the option selections. For example, the option selections may be ranked according to how responsive the option selections are to the call, such that an option selection that forwards the call to another number would be selected over an option selection that sends a message asking the caller to call back.

The intelligent call waiting system 140 processes an option selection by sending a call handling instruction to the telephone network 130 and/or sending an audio message to the caller phone 110 over the telephone network 130. The intelligent call waiting system 140 is configured to record, store, access, and play or redirect audio messages. The audio messages may be personalized by subscribers to the intelligent call waiting services and may be stored in a data store and indexed, for example, by direct number of the subscriber call destination phone.

The network 150 is configured to enable direct or indirect communications between the intelligent call waiting system 140, the online service provider system 160, and one or more call destination computer systems 170. Examples of the network 150 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the network 150 and the telephone network 130 are implemented by a single or otherwise integrated communications network configured to enable voice communications between the caller phone 110, the call destination phone 120, and the intelligent call waiting system 140, and to enable communications between the intelligent call waiting system 140, the online service provider system 160, and the one or more call destination computer systems 170.

The online service provider system 160 is a computer system configured to provide online data communications services to users, detect online presence of users of call destination computer systems 170, receive call notification messages from the intelligent call waiting system 140, generate format data and send the format data along with the call notification messages to call destination computer systems 170, and send option selections from the call destination computer systems 170 to the intelligent call waiting system 140. The online data communications services may include for example, e-mail services, instant messaging services, Internet access, and/or access to online content.

The online service provider system 160 may detect online presence of users of call destination computer systems 170 in, for example, a manner similar to that used to detect presence in an Instant Messaging system and/or in a manner similar to that disclosed in application number 10/414,167, hereby incorporated by reference in its entirety (in which clientside communication device monitors are used). The online service provider system 160 also is configured to receive call notification messages from the intelligent call waiting system 140, generate format data that is used to format the call notification message for presentation on the call destination computer systems 170, and send the call notification messages to the call destination computer systems 170 in real time.

The format data may vary based on device type. For example, with limited capabilities, the format data for a PDA may enable the PDA to limit the call notification message to a visual indication of the incoming call (e.g., illumination of a light and a graphical display of a call icon and the caller phone direct number or identity proxy thereof) and may further limit the call handling options that are presented to the user to a subset of the full suite of options (e.g., the option to forward the call to one other phone number). In contrast, the format data sent to a home computer may enable the home computer to provide, for example, an audio and visual indication of the call and to display full caller identity information including address, return phone number, and other information about the caller accessible based on the caller phone number. The format data sent to the home computer also may enable the home computer to present to the user a significantly larger number of call handling options (e.g., the option to play various audio messages, take a message, and forward the call to a phone number selected by the user from a large number of possible phone numbers).

The online service provider system 160 also is configured to transmit in real time the option selections from the call destination computer systems 170 to the intelligent call waiting system 140. Since the caller is waiting on the caller phone 110 during the generation and transmission of call notification messages, the selection of options by users of call destination computer systems 170, and the transmission processing of corresponding option selections, the online service provider system 160 is configured to send information to and receive information from the call destination computer systems 170 in real time. Accordingly, the online service provider system 160 may be configured to avoid queuing call notification messages or option selections or to avoid further processing the call notification messages or option selections in any way that increases transmission delay. The online service provider system 160 may be configured to provide this functionality in a manner similar to that used by instant messaging systems, or even to leverage instant messaging systems to enable transmission and receipt of instant messages in real time.

The call destination computer system 170 is configured to receive call notification messages and format data from the online service provider system 160, process the call notification messages in accordance with the format data to enable a user to perceive the call notification, accept user selection of one of the options offered by the call notification message, and send the option selection to the online service provider system 160. The call destination computer system includes a device 170A capable of executing instructions under the command of a controller 170B. The device 170A may be a general purpose computer, such as a workstation or a personal computer, a PDA, a special purpose computer, an intelligent mobile phone, a pager, or a set top box.

The controller 170B commands and directs communications between the device 170A of the call destination computer system 170 and the online service provider system 160. The controller 170B may include one or more software or hardware applications that enable digital communications to be received from the online service provider system 160. For example, the controller 170B may be a modified instant messaging application configured to receive notification messages and send option selections in a manner similar to that used to receive instant messages and send instant messages. The device 170A is connected to the controller 170B by a wired, wireless or virtual (i.e., when the controller is software running on the device) data pathway 170C capable of delivering data.

Figure 2:
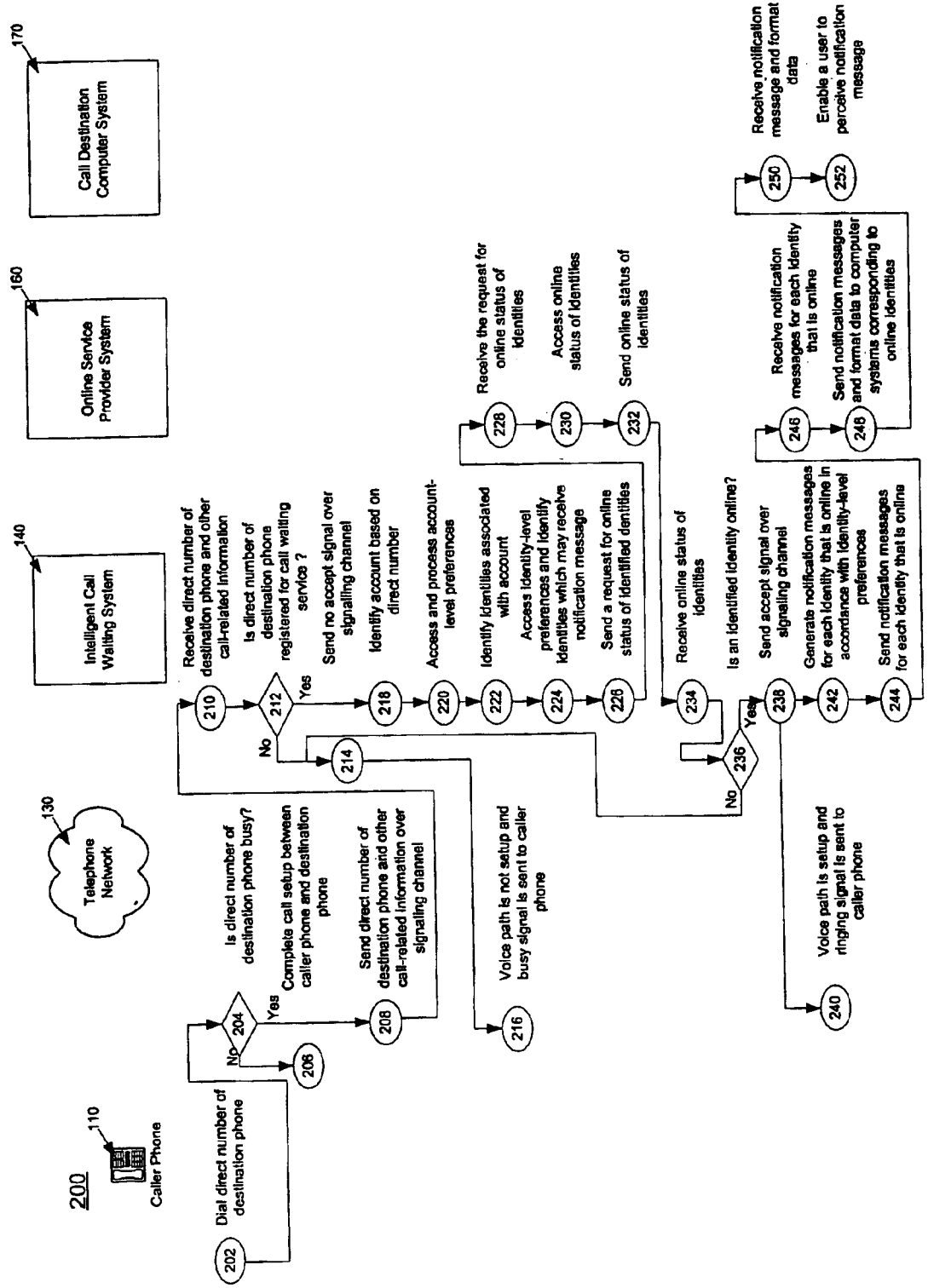
FIG. 2 is a flow chart illustrating a process for generating and delivering call notification messages.

FIG. 2 shows a process 200 for generating and delivering call notification messages. For convenience, particular components described with respect to FIG. 1 are referenced as performing the process 200. However, similar methodologies may be applied in other implementations where different components are used to define the structure of the system, or where the functionality is distributed differently among the components shown by FIG. 1. The process 200 is directed to generating and delivering call notification messages when the direct number of the call destination phone 120 is busy. However, a call notification message may additionally or alternatively be generated and delivered under various other conditions. For example, the call notification message may be generated and delivered when the call to the direct number of the call destination phone 120 is not answered after a predetermined number of rings, or, alternatively, the call notification message may be generated and delivered every time a call is directed to the direct number of the call destination phone 120, regardless of the phone line status.

The user of the caller phone 110 dials the direct number of the call destination phone 120 (202). The telephone network 130 determines whether the direct number of the call destination phone 120 is busy (204). If the direct number of the call destination phone is not busy, the telephone network 130 completes the call setup between the caller phone 110 and the call destination phone 120 (206).

If the direct number of the call destination phone 120 is busy, the telephone network 130 sends the call destination phone direct number and other call-related information over a signaling channel to the intelligent call waiting system 140 (208). The intelligent call waiting system 140 receives the direct number of the call destination phone 120 and the other call-related information (210) and determines whether the direct number of the call destination phone 120 is registered for the call waiting service (212). The intelligent call waiting system 140 may determine whether a direct number is registered for the call waiting service by accessing, for example, a registration data store indexed by phone numbers and storing records for those direct numbers that are receiving the call handling service.

If the direct number of the call destination phone 120 is not registered for the call handling service, the intelligent call waiting system 140 sends a "no accept" signal over the signaling channel to the telephone network 130 (214). In response to the no accept signal, the telephone network 130 sends a busy signal to the caller phone 110 and does not setup a voice path between the caller phone 110 and the intelligent call waiting system 140 (216). In another implementation, the intelligent call waiting system 140 instructs the telephone network 130 to redirect the voice path to a direct number corresponding to a voice messaging or voice mail system rather than instructing the telephone network 130 to send a busy signal.

If the direct number of the call destination phone 120 is registered for call handling service, the intelligent call waiting system 140, the intelligent call waiting system 140 identifies an account based on the direct number of the call destination phone 120 (218) and accesses and processes account-level preferences (220). The account may be identified, for example, by accessing an account record stored in a configuration or registration data store and indexed by direct number of call destination phone 120. The account-level preferences also may be stored in the account record. For example, the "Smith" account may be stored in the configuration data store under 703-123-4567 and may include the user identities "JillSmith2" and "JoeSmith3." If the call is not disposed of by applying the account-level preferences (e.g., the direct number of the caller phone 110 is not on a white list or a black list), the intelligent call waiting system 140 identifies identities associated with the account (222) and accesses identity-level preferences (224). In one implementation, the identities associated with an account are stored in an account record while the identity-level preferences are stored in identity records associated with the account record. In another implementation, the identities and the identity-level preferences are stored in an account record.

The intelligent call waiting system 140 determines which identities may be able to receive a call notification message based on the identity-level preferences (e.g., the direct number of the caller phone 110 may be on the prohibited list of some of the identities or parental controls may prohibit some of the identities from receiving a call notification message) (224). The intelligent call waiting system 140 then sends a request to the online service provider system 160 for the online status of the available identities (226).

The online service provider system 160 receives the request for the online status of the available identities (228) and accesses the online status of the available identities (230). The online status of the identities may be stored, for example, in a presence data store that is constantly updated in real-time in a manner similar to that used in instant messaging systems to reflect activity of a user at the call destination computer system 170. The online service provider system 160 sends the online status of the available identities to the intelligent call waiting system 140 (232).

The intelligent call waiting system 140 receives the online status of the available identities (234) and determines whether at least one identified identity is online (236). If no identified identities are online, process 200 proceeds to operation 214. If at least one identified identity is online, the intelligent call waiting system 140 sends an accept signal over the signaling channel to the telephone network 130 (238). In response to the accept signal, the telephone network 130 may send a ringing signal to the caller phone 110 and sets up a communications (e.g., voice) path with the caller phone 110 (240).

The intelligent call waiting system 140 generates a call notification message in accordance with identity-level preferences for each identified identity that is online (242). The intelligent call waiting system 140 sends the call notification messages for each identified identity that is online to the online service provider system 160 (244). The call notification messages typically are sent out in parallel by the intelligent call waiting system 140 to minimize transmission delays and the arrival time difference between call destination computer systems 170.

The online service provider system 160 receives the call notification messages for each identified identity that is online (246) and sends the call notification messages along with format data to call destination computer systems 170 corresponding to the online identities (248). The receiving of the call notification messages and sending of the call notification messages and format data is performed in real time. The call notification messages typically are sent out in parallel by the online service provider system 160 to minimize transmission delays and the arrival time difference between call destination computer systems 170.

Each call destination computer system 170 receives the call notification message and format data (250) and enables a user to perceive the call notification message (252). In one implementation, the call destination computer system 170 enables the user to perceive the call notification message as a pop-up window or dialog box that appears on a visual display of the call destination computer system 170.

Figure 3:
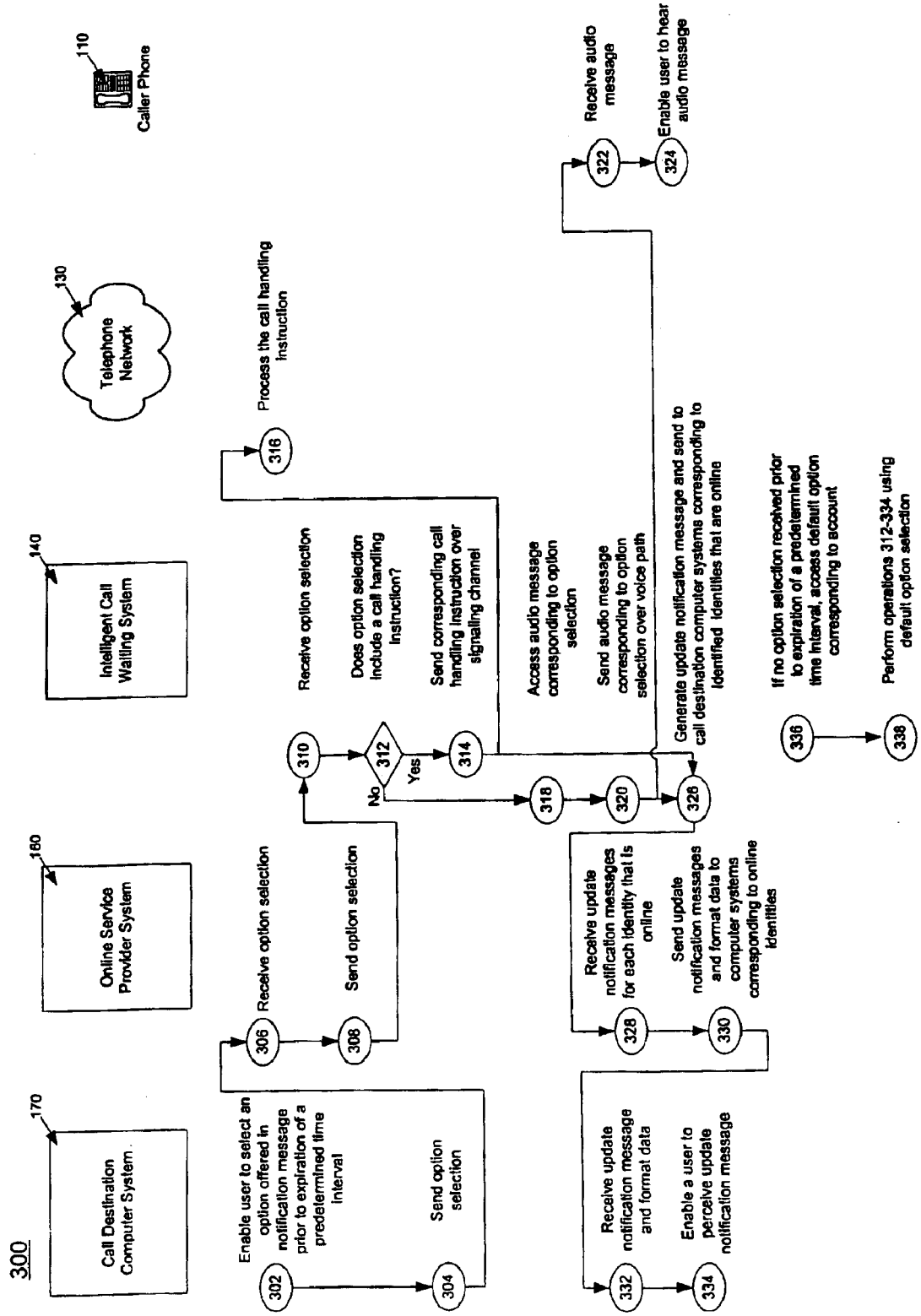
FIG. 3 is a flow chart illustrating a process for responding to a user selection of an option in a call notification message.

FIG. 3 shows a process 300 for responding to a user selection of an option in a call notification message. For ease of discussion, particular components described with respect to FIG. 1 are referenced as performing the process 300. However, similar methodologies may be applied in other implementations where different components are used to define the structure of the system, or where the functionality is distributed differently among the components shown by FIG. 1.

The call destination computer system 170 enables a user to select an option offered in the call notification message prior to expiration of a predetermined time interval (e.g., 15 seconds) (302). The call destination computer system 170 sends the option selection to the online service provider system 160 (304).

The online service provider system 160 receives the option selection (306) and sends the option selection to the intelligent call waiting system 140 (308), and does so in real time.

The intelligent call waiting system 140 receives the option selection (310). The process 300 employs a "first come, first serve" conflict resolution algorithm (i.e., the first option selection received is the option selection that will be used to process the call). In other implementations, such as an implementation in which a rank-based conflict resolution algorithm is used, the intelligent call waiting system 140 waits for a predetermined interval of time (e.g., 15 seconds) to receive option selections from multiple call destination computers 170, and selects one of the received options selections in accordance with the conflict resolution algorithm.

The intelligent call waiting system 140 determines whether the option selection includes a call handling instruction (i.e., an instruction to forward or ignore the call) (312). If the option selection includes a call handling instruction, the intelligent call waiting system 140 sends the call handling instruction to the telephone network 130 over the signaling channel (314). The telephone network 130 processes the call handling instruction and, if necessary, forwards or redirects the voice path accordingly (316). In some implementations, the intelligent call waiting system 140 accesses and sends an audio message over the voice path to the caller phone 110 prior to sending the call handling instruction to the telephone network 130 (e.g., the audio message "The phone you are calling is busy. Please stay on the line and you will be transferred to an alternative number." May be sent prior to sending the call handling instruction to forward the call).

If the option selection does not correspond to a call handling instruction, then the intelligent call waiting system 140 accesses an audio message corresponding to the option selection (318) and sends the audio message corresponding to the option selection over the voice path to the caller phone 110 (320). The caller phone 110 receives the audio message (322) and enables a user to hear the audio message (324).

After or contemporaneous with sending the call handling instruction to the telephone network 130 and/or sending an audio message to the caller phone 110, the intelligent call waiting system 140 generates an updated call notification message for each identified identity that is online and sends the updated call notification messages to the online service provider system 160 (326). The online service provider system 160 receives the updated call notification messages (328) and sends the updated call notification messages to the corresponding call destination computer systems 170 (330).

Each call destination computer system 170 receives an updated call notification message (332) and enables a user to perceive the updated call notification message (334). In one implementation, the updated call notification message is presented to users as a dialog box or pop-up window that displays the option selection that was used for processing the call and the identity that submitted that option selection, if applicable (i.e., an identity is not shown if the call was processed in accordance with a default option selection as discussed below).

If the intelligent call waiting system 140 does not receive an option selection within a predetermined time interval from any of the call destination computer systems 170 that received call notification messages (e.g., at 306), the intelligent call waiting system 140 automatically accesses a default option selection corresponding to the account (and stored as an account-level preference) (336). The intelligent call waiting system 140 processes the default option selection in accordance with operations 312–334 (338).

Figure 4:
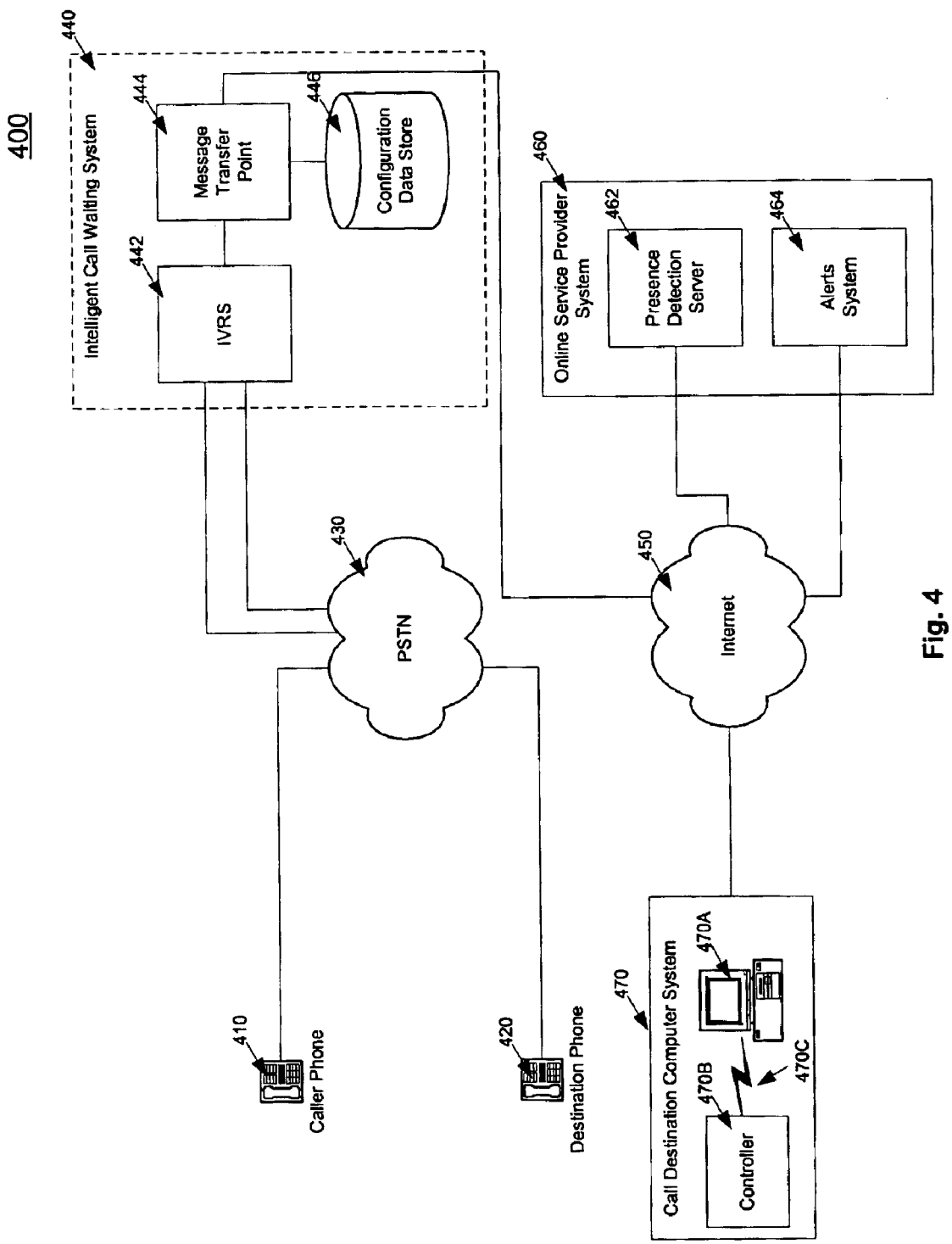
FIG. 4 is block diagram of an exemplary implementation of the communications system of FIG. 1 used for providing multi-user intelligent call waiting.

FIG. 4 shows one exemplary implementation 400 of the communications system 100 of FIG. 1 configured to provide multi-user intelligent call waiting. The communications system 400 includes a caller phone 410, a call destination phone 420, a telephone network 430, an intelligent call waiting system 440, a network 450, an online service provider system 460, and one or more call destination computer systems 470. Each call destination computer system 470 includes a device 470A that communicates with a controller 470B over a data pathway 470C. Examples of each element within the communications system 400 of FIG. 4 are described broadly above with respect to FIG. 1. In particular, the caller phone 410, the call destination phone 420, the PSTN 430, the Internet 450, and the call destination computer systems 470 typically have attributes comparable to those described with respect to the caller phone 110, the call destination phone 120, the telephone network 130, the network 150, and the call destination computer systems 170 of FIG. 1, respectively. Likewise, the intelligent call waiting system 440 and the online service provider system 460 typically have attributes comparable to and illustrate one possible implementation of the intelligent call waiting system 140 and the online service provider system 160 of FIG. 1.

The intelligent call waiting system 440 includes an interactive voice response system (IVRS) 442, a message transfer point 444, and a configuration data store 446. The online service provider system 460 includes a presence server 462 and an alerts system 464.

The IVRS 442 is a telephony-facing computer system that sends call handling instructions to the PSTN 430 and stores, records, and sends audio messages to the caller phone 410 through the PSTN 430. The call handling instructions include, for example, accepting a call, rejecting a call, and redirecting a call. The IVRS 442 also sends call-related information to the message transfer point and receives instructions regarding which call handling instruction should be sent to the PSTN 430 and/or audio message should be accessed and sent through the PSTN 430.

The message transfer point 444 is an IP-facing computer system that validates a call received by the IVRS 442, generates and sends call notification messages to the alerts system 464, receives option selections from the alerts system 464, and sends instructions corresponding to the received option selections to the IVRS 442. The message transfer point 444 accesses the configuration data store 446 to validate a call received by the IVRS 442 and to access account-level and identity-level call waiting preferences. The message transfer point 444 also requests online status of identities from the presence server 462 of the online service provider system 460.

The configuration data store 446 is a data storage device that is communicatively coupled to the message transfer point 444 and that includes account records and identity records. The account records store account-level call waiting preferences and may be indexed by subscriber phone number (i.e., the direct number of the call destination phone 420). The identity records store identity-level call waiting preferences and may be indexed by account number or by subscriber phone number.

The presence server 462 is a server that receives, updates, and publishes online presence data for each identity. The presence server 462 enables the message transfer point 444 to access online status data for particular identities. In one implementation, the presence server 462 is functionally similar to the central server in an instant messaging system that receives periodic online status updates from call destination computer systems 470. In another implementation, the presence server 462 is functionally similar to the presence detection system disclosed in application 10/414,167 that receives communication device status data and user availability to perceive communications data from a device monitor coupled to the device 470B of the call destination computer system 470. In this implementation, the message transfer point 444 includes the functionality of a device monitoring system.

The alerts system 464 is a computer system configured to enable real time or near real time transmission of call notification messages to call destination computer systems 470 from the message transfer point 444 and transmission of the option selections from call destination computer systems 470 to the message transfer point 444. The alerts system 464 is configured to provide this functionality in a manner similar to that used by instant messaging systems to enable transmission and receipt of instant messages in real time. Such a system has been described, for example, in application 10/320,712, hereby incorporated by reference.

Figure 5A:
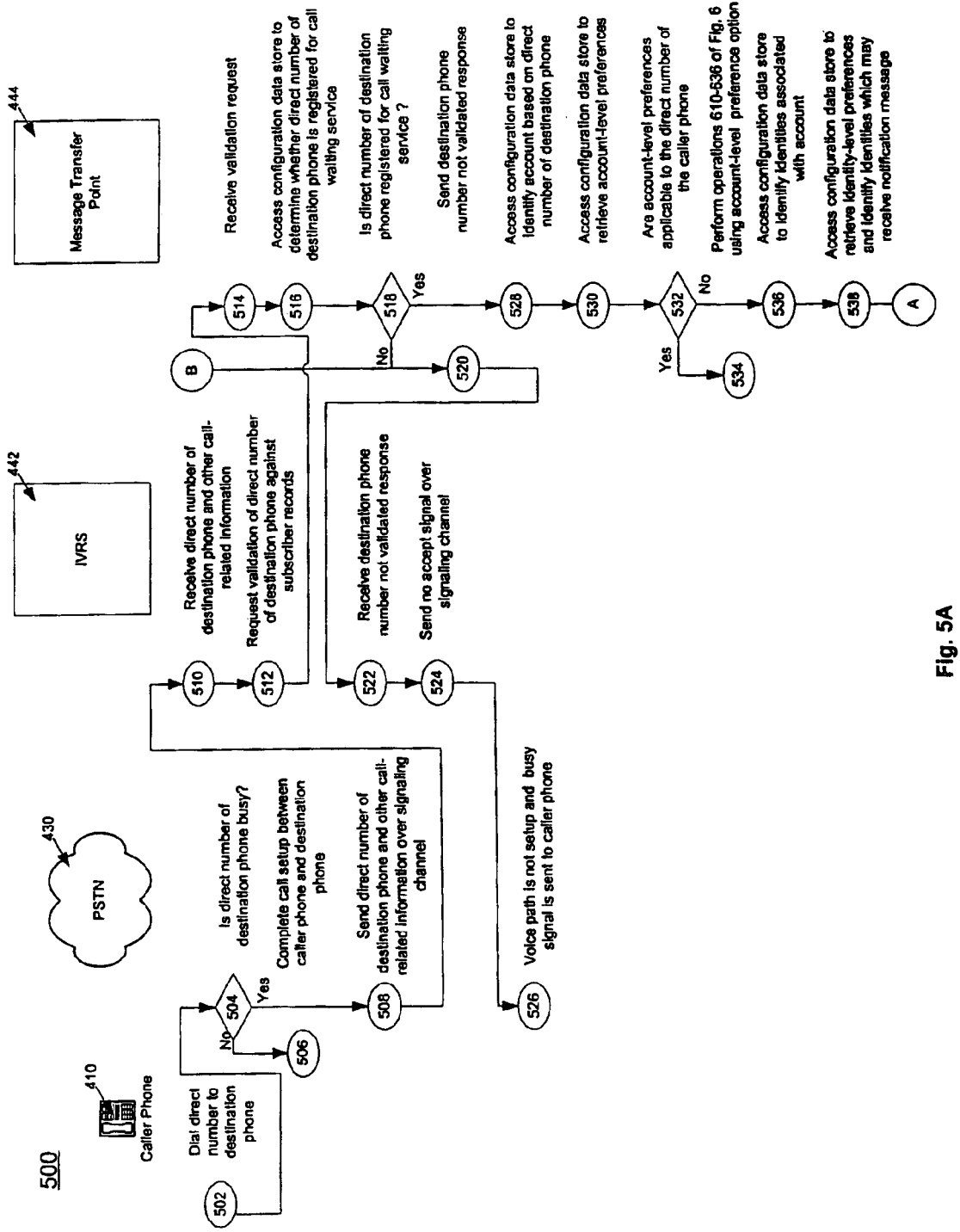

FIGS. 5A and 5B show a process 500 for generating and delivering call notification messages. For case of discussion, particular components described with respect to FIG. 4 are referenced as performing the process 500. However, similar methodologies may be applied in other implementations where different components are used to define the structure of the system, or where the functionality is distributed differently among the components shown by FIG. 4. Process 500 corresponds to process 200 but applied to the communications system 400 rather than to the communications system 100.

The user of the caller phone 410 dials the direct number of the call destination phone 420 (502). The PSTN 430 determines whether the direct number of the call destination phone 420 is busy (504). If the direct number of the call destination phone is not busy, no call waiting is necessary, and the PSTN 430 completes the call setup between the caller phone 410 and the call destination phone 420 (506).

If the direct number of the call destination phone 420 is busy, the PSTN 430 sends the call destination phone direct number and other call-related information over a signaling channel to the IVRS 442 (508). The IVRS 442 receives the direct number of the call destination phone 420 and the other call-related information (510) and sends a validation request to the message transfer point 444 to determine whether the direct number of the call destination phone 420 is registered for call waiting service (512).

The message transfer point 444 receives the validation request (514) and accesses the configuration data store 446 (516) to determine whether the direct number of the call destination phone 420 is registered for call waiting service (518). If the direct number of the call destination phone 420 is not registered for call waiting service, the message transfer point 444 sends a destination number not validated response to the IVRS 442 (520). The IVRS 442 receives the destination phone number not validated response (522) and sends a no accept signal over the signaling channel to the PSTN 130 (524). In response to the no accept signal, the PSTN 130 sends a busy signal to the caller phone 410 and does not setup a voice path between the caller phone 410 and the IVRS 442 (526). ). In another implementation, the IVRS 442 instructs the PSTN 130 to redirect the voice path to a direct number corresponding to a voice messaging or voice mail system rather than instructing the PSTN 130 to send a busy signal.

If the direct number of the call destination phone 420 is registered for call waiting service, the message transfer point 444 accesses the configuration data store 446 to identify an account based on the direct number of the call destination phone 420 (528) and to retrieve account-level preferences (530). The account may be identified, for example, by accessing an account record stored in the configuration data store 446 and indexed by direct number of call destination phone 120. The account-level preferences also may be included in the account record. The message transfer point 444 determines whether account-level preferences are applicable to the direct number of the caller phone 410 (532). If account-level preferences are applicable, then the message transfer point 444 performs operations 610–636 (FIG. 6) using the account-level preference option stored in the account record (534).

If account-level preferences are not applicable to the direct number of the caller phone 410 (e.g., the direct number of the caller phone 410 is not on a white list or a black list), or if appropriate, after applying account-level preferences, the message transfer point 444 accesses the account record stored in the configuration data store 446 to identify identities associated with the account (536). The message transfer point 444 accesses corresponding identity records to retrieve identity-level preferences (538).

The message transfer point 444 identifies which identities may be able to receive a call notification message based on the identity-level preferences (e.g., the direct number of the caller phone 410 may be on the prohibited list of some of the identities or parental controls may prohibit some of the identities from receiving a call notification message) (538). The message transfer point 444 sends a request to the presence server 462 for the online status of the identified identities (540).

The presence server 462 receives the request for the online status of the identified identities (542) and accesses the online status of the identified identities from a data store (544). The presence server 462 sends the online status of the identified identities to the message transfer point 444 (546).

The message transfer point 444 receives the online status of the identified identities (548) and determines whether at least one identified identity is online (550). If no identified identities are online, process 500 proceeds to operation 520. If at least one identified identity is online, the message transfer point 444 sends a destination phone number validated response to the IVRS 442 (552). The IVRS 442 receives the destination phone number validated response (554) and sends an accept signal over the signaling channel to the PSTN 430 (556). In response to the accept signal, the telephone network 430 sends a ringing signal to the caller phone 410 and sets up a voice path between the caller phone 410 and the IVRS 442 (558).

The message transfer point 444 accesses the configuration data store 446 to retrieve call notification format information corresponding to the identified identities that are online (560). The call notification format information may be stored in the identity records as an identity-level call waiting preference. The message transfer point 444 generates a call notification message for each identity that is online in accordance with the retrieved call notification message formats (562) and sends the call notification messages to the alerts system 464 (564).

The alerts system 464 receives the call notification messages (566) and sends the call notification messages along with format data to call destination computer systems 470 corresponding to the online identities (568). The receiving of the call notification messages and sending of the call notification messages and format data are performed in real time.

Each call destination computer system 470 receives the call notification message and format data (570) and enables a user to perceive the call notification message (572). In one implementation, the call destination computer system 470 enables the user to perceive the call notification message as a pop-up window or dialog box that appears on a visual display of the call destination computer system 470.

FIG. 6 shows a process 600 for responding to a user selection of an option in a call notification message. For case of discussion, particular components described with respect to FIG. 4 are referenced as performing the process 600. However, similar methodologies may be applied in other implementations where different components are used to define the structure of the system, or where the functionality is distributed differently among the components shown by FIG. 4. Process 600 corresponds to process 300 but applied to the communications system 400 rather than to the communications system 100.

The call destination computer system 170 enables a user to select an option offered in the call notification message prior to expiration of a predetermined time interval (e.g., 15 seconds) (602). The call destination computer system 170 sends the option selection to the alerts system 464 (604).

The alerts system 464 receives the option selection (606) and sends the option selection to the message transfer point 444 (608). The alerts system 464 is configured to receive and send the option selection to the message transfer point 444 in real time.

The message transfer point 444 receives the option selection (610). The process 600 assumes that a "first come, first serve" conflict resolution algorithm is being used (i.e., the first option selection received is the option selection that will be used to process the call). However, if a rank-based conflict resolution algorithm is used, the message transfer point 444 waits for a predetermined interval of time (e.g., 15 seconds) to receive option selections from multiple call destination computers 470, determines which of the received options selections has been assigned the highest rank in accordance with identity-level preferences, and proceeds to operation 612 using the option selection corresponding to the option selection that has been assigned the highest rank.

The message transfer point 444 determines whether the option selection includes a call handling instruction (i.e., an instruction to forward or ignore the call) (612). If the option selection includes a call handling instruction, the message transfer point 444 sends a call handling response corresponding to the call handling instruction to the IVRS 442 (614). The call handling response may be, for example, an identification number used by the IVRS 442 to determine the call handling instruction that will be sent to the PSTN 430.

The IVRS 442 receives the call handling response (616) and sends a corresponding call handling instruction to the PSTN 430 over the signaling channel (618). The PSTN 430 processes the call handling instruction and, if necessary, forwards or redirects the voice path accordingly to (620).

If the option selection does not correspond to a call handling instruction, then the message transfer point 444 sends an audio message response corresponding to the audio message to the IVRS 442 (622). The audio message response may be, for example, an identification number used by the IVRS 442 to identify the storage location of the audio message that will be sent to the caller phone 410.

The IVRS 442 receives the audio message response (624), accesses an audio message corresponding to the audio message response (626) and sends the audio message over the voice path to the caller phone 410 (628). The caller phone 410 receives the audio message (630) and enables a user to hear the audio message (632).

After sending a call handling response and/or an audio message response to the IVRS 442, the message transfer point 444 generates an updated call notification message for each identified identity that is online and sends the updated call notification messages to the alerts system 464 (634). The alerts system 464 receives the updated call notification messages (636) and sends the updated call notification messages to the corresponding call destination computer systems 470 (638). Each call destination computer system 470 receives an updated call notification message (640) and enables a user to perceive the updated call notification message (642).

If the message transfer point 444 does not receive an option selection after a predetermined interval of time from any of the call destination computer systems 470 that received call notification messages, the message transfer point 444 automatically accesses a default option selection corresponding to the account (and stored as an account-level preference) (644). The message transfer point 444 processes the default option selection in accordance with operations 612–642 (646).

A number of implementations have been described. Nevertheless, it will be understood that various modifications may be made. For example, the systems and processes refer to a voice path and a signaling channel. In some implementations, the voice path and the signaling channel are separated (i.e., out-of-band signaling). In other implementations, the voice path and the signaling channel are integrated into one channel (i.e., in-band signaling) that handles the transmission of audio data as well as the transmission of call handling data.

The telephone network 130 may be configured to always send a signal to the intelligent call waiting system 140, regardless of whether the call destination phone 120 is busy or is not answered. In response to the signal, the intelligent call waiting system 140 sends a call notification message to user identities associated with the call destination phone 120 that are online. In this manner, the user identities may monitor the use of the of the call destination phone 120. Such monitoring may be used, for example, to enable parental control of the call destination phone 120 (e.g., a father may want to known who has been calling his daughter).

Accordingly, other implementations are within the scope of the following claims.

What is claimed is:

1. A method for alerting an intended recipient of a phone call, the method comprising:

identifying an account based on a phone call received from a caller;

accessing configuration data related to the account;

identifying several identities associated with the account based on the configuration data accessed;

determining a first identity from among the several identities based on the configuration data accessed;

determining whether the first identity is available to receive a first electronic communication associated with the phone call; and sending to the first identity the first electronic communication associated with the phone call conditioned on whether the first identity is determined to be available to receive the first electronic communication.

2. The method of claim 1, wherein determining whether the first identity is available includes checking an online status for the first identity, and wherein the first electronic communication is sent to the first identity if the first identity is determined to be online.

3. The method of claim 1, wherein identifying an account based on a phone call comprises identifying an account based on call related information received from a telephone network.

4. The method of claim 3, wherein the call-related information includes a call destination phone number and is extracted from an integrated services digital network call setup.

5. The method of claim 1, further comprising receiving call origin information from a telephone network wherein the call origin information includes a caller phone number and is received through an automatic number identification service.

6. The method of claim 5, wherein the first electronic communication includes at least a portion of the call origin information, such that at least a portion of the call origin information is sent to the first identity if the first identity is determined to be available to receive the call origin information.

7. The method of claim 1, wherein the several identities comprise user identifiers through which an online status of an associated user may be determined.

8. The method of claim 7, wherein the several identities comprise screen names for an instant messaging application.

9. The method of claim 1, wherein accessing configuration data includes accessing call waiting preferences that are tailored to each of the several identities.

10. The method of claim 9, wherein determining a first identity from among the several identities comprises determining the first identity based on the call waiting preferences.

11. The method of claim 10, wherein determining a first identity based on the call waiting preferences comprises:
examining call waiting preferences of the several identities to determine whether a phone number of the caller is included in a block list maintained for one or more of the several identities, and
selecting the first identity from among the several identities if the block list maintained for the first identity does not include the phone number of the caller.

12. The method of claim 10, wherein determining a first identity based on the call waiting preferences comprises:
accessing parental controls associated with one or more of the several identities, and
selecting the first identity based on whether the parental controls associated therewith effect restrictions for a phone number of the caller.

13. The method of claim 10, wherein determining a first identity based on the call waiting preferences comprises
accessing parental controls associated with one or more of the several identities, and
selecting the first identity based on whether the parental controls associated therewith effect restrictions for a phone number of the caller based on the time of day in which the call was received.

14. The method of claim 1, further comprising making available to the first identity call processing options that will be presented by a call destination computer system to the first identity.

15. The method of claim 14, wherein the call processing options include an option to forward the call to another phone number.

16. The method of claim 14, wherein the call processing options include an option to take a message from a calling party.

17. The method of claim 14, wherein the call processing options include an option to ignore the call.

18. The method of claim 14, wherein the call processing options include an option to send an audio message to the caller.

19. The method of claim 18, wherein the audio message is selectable by the first identity from among multiple different audio messages.

20. The method of claim 19, wherein the multiple different audio messages include an audio message that informs the caller that the call is being redirected to another phone number.

21. The method of claim 19, wherein the multiple different audio messages include an audio message that informs the caller that the call will be answered by a call recipient shortly.

22. The method of claim 14, wherein the call processing options are tailored to the first identity.

23. The method of claim 14, further comprising receiving and processing an option selection from the first identity.

24. The method of claim 23, further comprising varying the processing performed with respect to the option selection based upon whether the option selection is received from the first identity within a predetermined interval of time.

25. The method of claim 23, wherein processing the option selection includes sending a call handling instruction that corresponds to the option selection to a telephone network through which the phone call was made.

26. The method of claim 25, wherein the call handling instruction directs the telephone network to forward the call.

27. The method of claim 26, wherein the call handling instruction directs the telephone network to forward the call to a voicemail system.

28. The method of claim 23, wherein processing the option selection includes sending to the caller an audio message that corresponds to the option selection.

29. The method of claim 14, further comprising accessing and processing a default option selection if no option selection is received from the first identity within a predetermined interval of time.

30. The method of claim 1 further comprising:
determining a second identity from among the several identities to receive a second electronic communication associated with the phone call;
determining whether the second identity is available to receive a second electronic communication associated with the phone call; and
sending to the second identity the second electronic communication associated with the phone call conditioned on whether the second identity is determined to be available to receive the second electronic communication.

31. The method of claim 30, wherein the first electronic communication includes data corresponding to call processing options that will be presented to the first identity by a first call destination computer system and the second electronic communication includes data corresponding to call processing options that will be presented to the second identity by a second call destination computer system.

32. The method of claim 31, wherein the first call destination computer and the second call destination computer are a single computer accessible to both the first identity and the second identity.

33. The method of claim 31, further comprising receiving a first option selection from the first identity and a second option selection from the second identity.

34. The method of claim 33, further comprising responding to the phone call in accordance with the first option selection if the first option selection is received before the second option selection.

35. The method of claim 33, further comprising:
accessing a rank for the first option selection and for the second option selection; and
responding to the phone call in accordance with the first option selection if the first option selection has a higher rank than the second option selection.

36. The method of claim 33, further comprising:
accessing a rank for the first identity and for the second identity; and responding to the phone call in accordance with the first option selection if the first identity has a higher rank than the second identity.

37. A computer system for alerting an intended recipient of a phone call, the computer system comprising:
a data store for storing configuration data;
a telephony interface element configured to receive a phone call from a caller; and
a call processing element configured to
identify an account based on the phone call;
access the data store to retrieve configuration data related to the account;
identify several identities associated with the account based on the
configuration data accessed;
determine a first identity from among the several identities based on the
configuration data accessed;
determine whether the first identity is available to receive a first electronic
communication associated with the phone call; and
sending to the first identity the first electronic communication associated with
the phone call conditioned on whether the first identity is determined to be available to receive the first electronic communication.

38. The computer system of claim 37, wherein the telephony interface element comprises an interactive voice response system.

39. The computer system of claim 37, wherein the call processing element is configured to determine the availability of the first identity by requesting the online status of the first identity from an online service provider system.

40. The computer system of claim 37, wherein the call processing element is configured to determine the online status of the first identity by requesting the online status of the first identity from a presence server of the online service provider system.

41. The computer system of claim 40, wherein the presence server of the online service provider system is a computer that receives, updates, and publishes online presence data for identities.

42. The computer system of claim 37, wherein the call processing element is configured to send to the first identity the first electronic communication by sending the first electronic communication to an online service provider system which sends the first electronic communication to the first identity.

43. The computer system of claim 37, wherein the call processing element is configured to send to the first identity the first electronic communication by sending the first electronic communication to an alerts system of an online service provider system which sends the first electronic communication to the first identity.

44. The computer system of claim 43, wherein the alerts system is a computer system configured to enable real time or near real time transmission of the first electronic communication to the first identity.

45. The computer system of claim 37, wherein the telephony interface element is further configured receive call-related information from a telephone network and to send the call-related information to the call processing element and the call processing element is configured to identify an account based on the call-related information.

46. The computer system of claim 45, wherein the call-related information includes a call destination phone number and the telephony interface element is configured to receive the call destination phone number which is extracted from an integrated services digital network call setup.

47. The computer system of claim 45, wherein the telephony interface element is configured to receive call origin information from the telephone network wherein the call origin information includes a caller phone number and is received by the telephony interface element through an automatic number identification service.

48. The computer system of claim 47, wherein the first electronic communication includes at least a portion of the call origin information, such that at least a portion of the call origin information is sent to the first identity if the first identity is determined to be available to receive the call origin information.

49. The computer system of claim 37, wherein the several identities comprise user identifiers through which an online status of an associated user may be determined.

50. The computer system of claim 49, wherein the several identities comprise screen names for an instant messaging application.

51. The computer system of claim 37, wherein the call processing element is configured to retrieve configuration data that includes call waiting preferences that are tailored to each of the several identities.

52. The computer system of claim 51, wherein the call processing element is configured to determine a first identity from among the several identities based on the call waiting preferences.

53. The computer system of claim 52, wherein the call processing element is configured to:
examine call waiting preferences of the several identities to determine whether a phone number of the caller is included in a block list maintained for one or more of the several identifiers, and
select the first identity from among the several identities if the block list maintained for the first identity does not include the phone number of the caller.

54. The computer system of claim 52, wherein the call processing element is configured to determine a first identity based on the call waiting preferences by:
accessing parental controls associated with one or more of the several identifiers, and
selecting the first identity based on whether the parental controls associated therewith effect restrictions for a phone number of the caller.

55. The computer system of claim 52, wherein the call processing element is configured to determine a first identity based on the call waiting preferences by:
accessing parental controls associated with one or more of the several identifiers, and
selecting the first identity based on whether the parental controls associated therewith effect restrictions for a phone number of the caller based on the time of day in which the call was received.

56. The computer system of claim 37, wherein the call processing element makes available to the first identity call processing options that will be presented by a call destination computer system to the first identity.

57. The computer system of claim 56, wherein the call processing options include an option to forward the call to another phone number.

58. The computer system of claim 57, wherein the call processing element is further configured to receive and process an option selection from the first identity.

59. The computer system of claim 58, wherein the call processing element is further configured to vary the processing performed with respect to the option selection based upon whether the option selection is received from the first identity within a predetermined interval of time.

60. The computer system of claim 58, wherein the call processing element is further configured to process the option selection by sending a response to the telephony interface element directing the telephony interface element to send a call handling instruction that corresponds to the option selection to a telephone network through which the phone call was made.

61. The computer system of claim 60, wherein the call handling instruction directs the telephone network to forward the call.

62. The computer system of claim 60, wherein the call handling instruction directs the telephone network to forward the call to a voicemail system.

63. The computer system of claim 60, wherein the call processing element is configured to process the option selection by sending an audio message that corresponds to the option selection to the caller.

64. The computer system of claim 56, wherein the call processing options include an option to take a message from a calling party.

65. The computer system of claim 56, wherein the call processing options include an option to ignore the call.

66. The computer system of claim 56, wherein the call processing options include an option to send an audio message to the caller.

67. The computer system of claim 66, wherein the audio message is selectable by the first identity from among multiple different audio messages.

68. The computer system of claim 67, wherein the multiple different audio messages include an audio message that informs the caller that the call is being redirected to another phone number.

69. The computer system of claim 67, wherein the multiple different audio messages include an audio message that informs the caller that the call will be answered by a call recipient shortly.

70. The computer system of claim 56, wherein the call processing options are tailored to the first identity.

71. The computer system of claim 56, wherein the call processing element is further configured to access and process a default option selection if no option selection is received from the first identity within a predetermined interval of time.

72. The computer system of claim 37, wherein the call processing element is further configured to:
determine a second identity from among the several identities to receive a
second electronic communication associated with the phone call
determine whether the second identity is available to receive a second
electronic communication associated with the phone call; and
send to the second identity the second electronic communication associated with the phone call conditioned on whether the second identity is determined to be available to receive the second electronic communication.

73. The computer system of claim 72, wherein the first electronic communication includes data corresponding to call processing options that will be presented to the first identity by a first call destination computer system and the second electronic communication includes data corresponding to call processing options that will be presented to the second identity by a second call destination computer system.

74. The computer system of claim 73, wherein the first call destination computer and the second call destination computer are a single computer accessible to both the first identity and the second identity.

75. The computer system of claim 73, wherein the call processing element is further configured to receive a first option selection from the first identity and a second option selection from the second identity.

76. The computer system of claim 75, wherein the call processing element is further configured to respond to the phone call in accordance with the first option selection if the first option selection is received before the second option selection.

77. The computer system of claim 75, wherein the call processing element is further configured to:
access a rank for the first option selection and for the second options selection; and
respond to the phone call in accordance with the first option selection if the first option selection has a higher rank than the second option selection.

78. The computer system of claim 75, wherein the call processing element is further configured to:
access a rank for the first identity and for the second identity; and
respond to the phone call in accordance with the first option selection if the first identity has a higher rank than the second identity.

79. An apparatus for alerting an intended recipient of a phone call, the apparatus comprising:
means for identifying an account based on a phone call received from a caller;
means for accessing configuration data related to the account;
means for identifying several identities associated with the account based on the configuration data accessed;
means for determining a first identity from among the several identities based on the configuration data accessed;
means for determining whether the first identity is available to receive a first electronic communication associated with the phone call; and
means for sending to the first identity the first electronic communication associated with the phone call conditioned on whether the first identity is determined to be available to receive the first electronic communication.

* * * * *